United States Patent [19]

Stallings

[11] Patent Number: 5,092,379

[45] Date of Patent: Mar. 3, 1992

[54] WORKSTAND FOR A HAND-HELD ELECTRIC PLANER

[76] Inventor: Stephen Stallings, 4 Gayland St., Burlington, Mass. 01803

[21] Appl. No.: 635,718

[22] Filed: Dec. 28, 1990

[51] Int. Cl.⁵ ............................................. B27C 9/00
[52] U.S. Cl. .................................. 144/286 R; 83/574; 51/166 TS; 144/114 R; 144/117 R; 144/134 R
[58] Field of Search ....... 83/574; 51/166 TS, 166 FB, 51/240; 144/2 R, 114 R, 1 E, 1 F, 117 R, 286 R, 286 A, 134 R

[56] References Cited

U.S. PATENT DOCUMENTS 4,265,283  5/1981  Nash et al. ............... 144/286 R
4,335,765  6/1982  Murphy ....................... 144/286 R Primary Examiner—W. Donald Bray
Attorney, Agent, or Firm—Wolf, Greenfield & Sacks

[57] ABSTRACT

A workstand for supporting a hand-held electric planer is provided in which the planer is mounted to a vertical wall extending from a base so that the planing surface is parallel to the base and abuts the vertical wall. A biasing device is provided for pressing a workpiece against the planing surface to provide for even planing of the workpiece. An upper section of the vertical wall may be inclined towards the planing surface so that the planer can operate as a joiner.

13 Claims, 4 Drawing Sheets

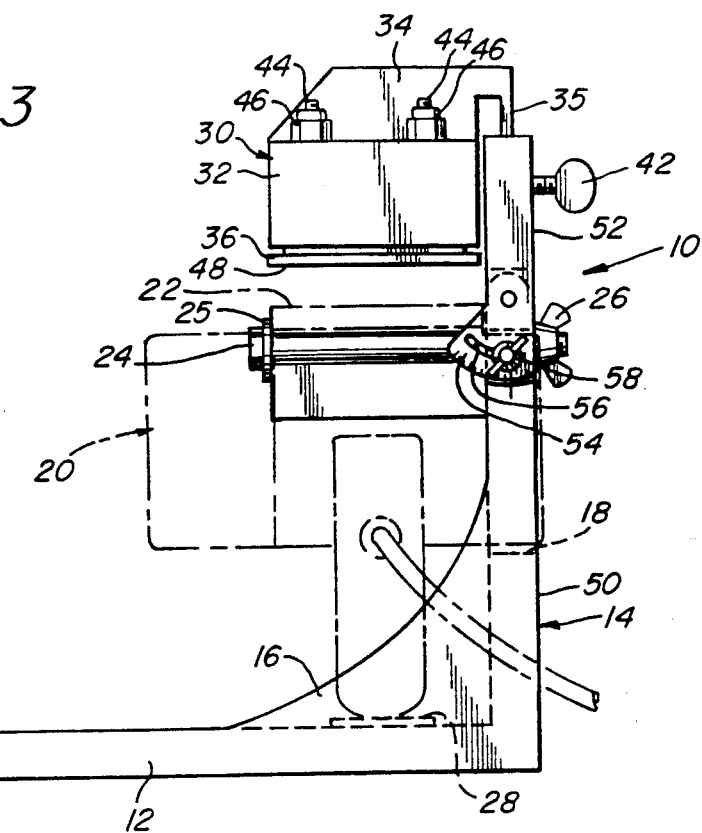
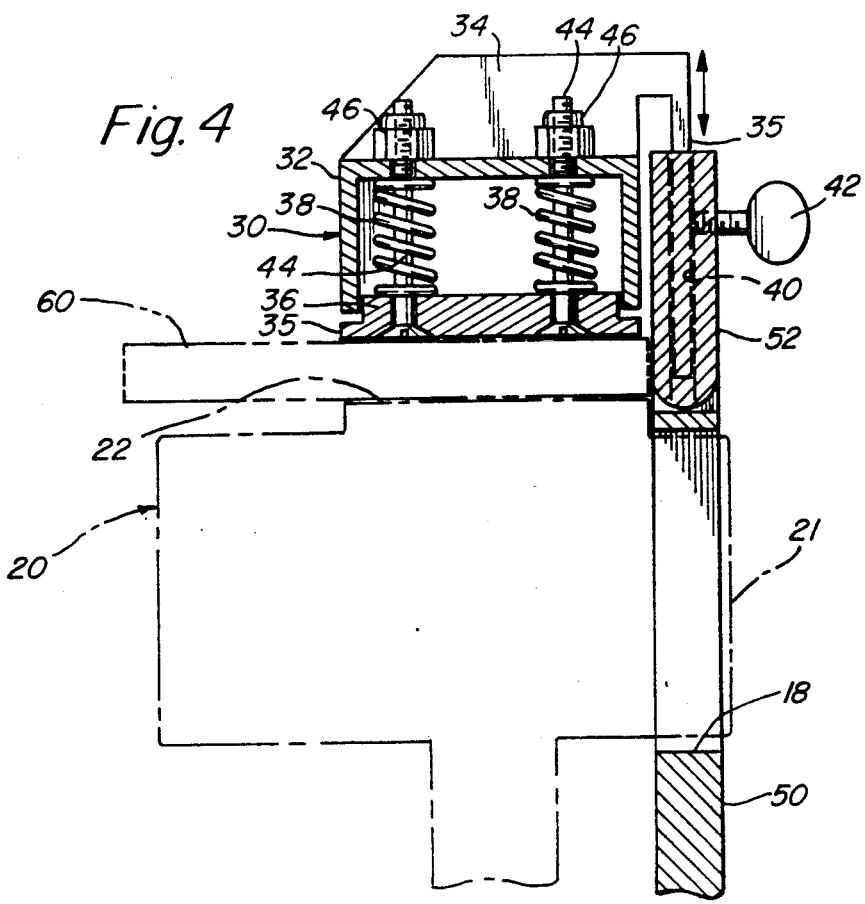

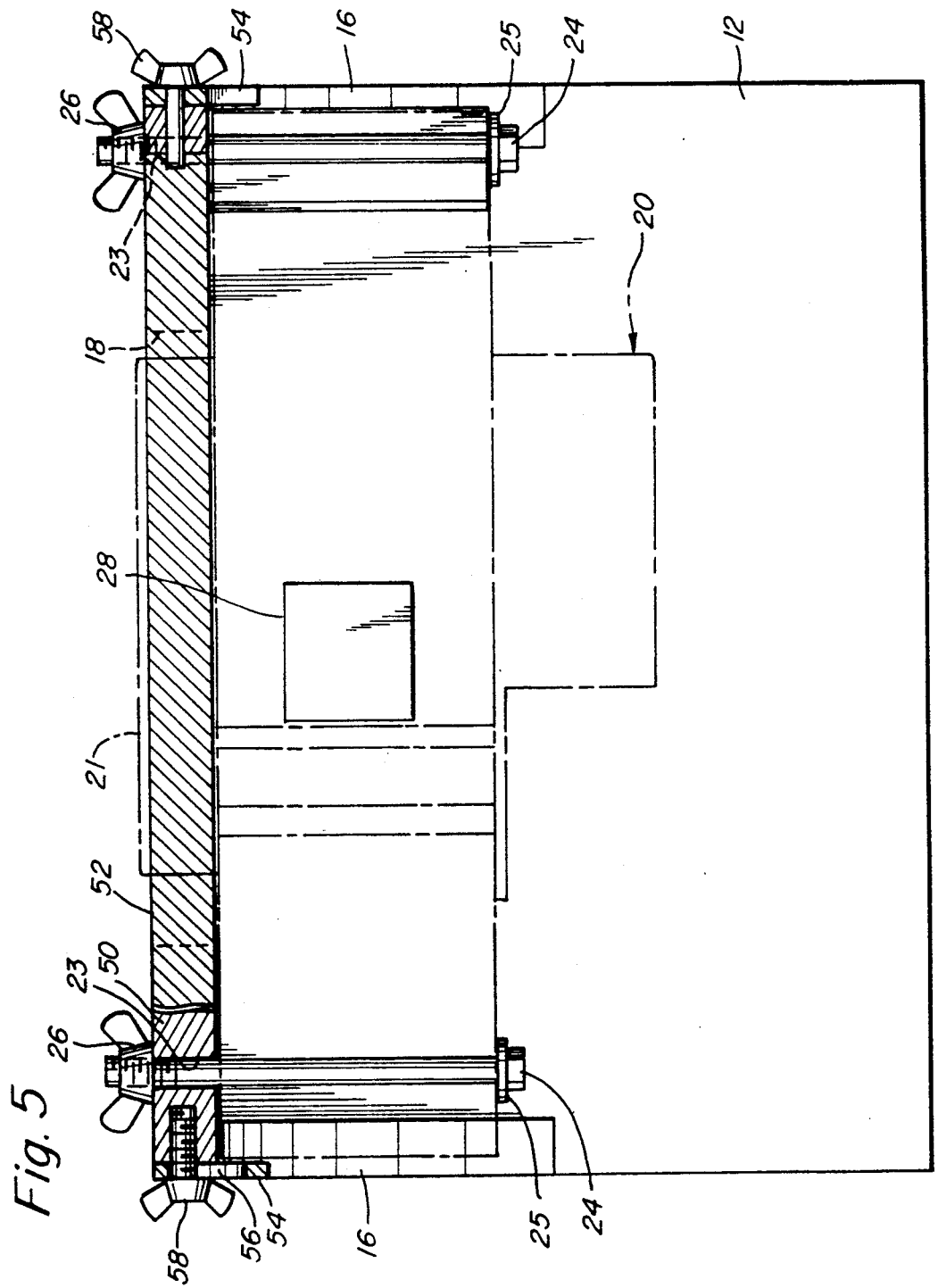

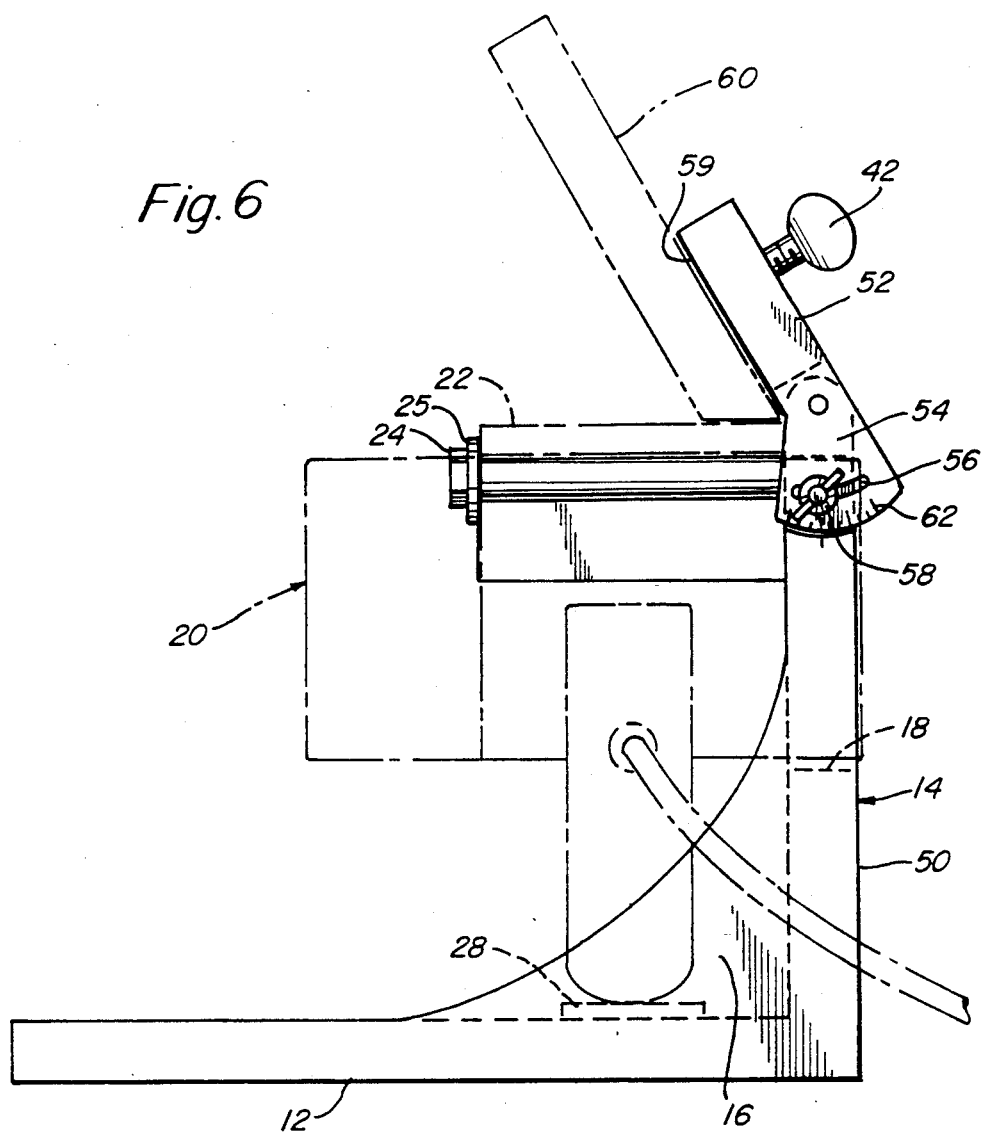
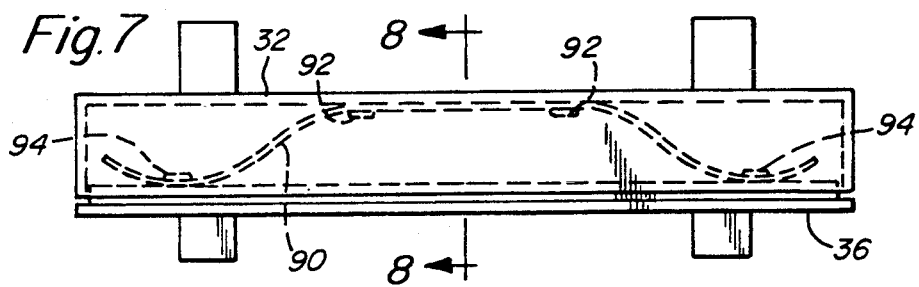
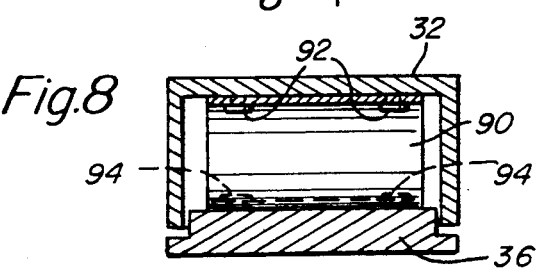

WORKSTAND FOR A HAND-HELD ELECTRIC PLANER

FIELD OF THE INVENTION

The present invention relates to a workstand for supporting an electric hand tool to increase its versatility and in particular to a workstand for supporting a hand-held electric planer so that it may be used as a table planer for thickness or surface planing or as a joiner.

BACKGROUND OF THE INVENTION

Joiners and surface planers are typically large and heavy pieces of machinery. Consequently, such joiners and surface planers are effectively non-portable devices. A craftsman must either prepare all the pieces which require finishing with a joiner or surface planer at a shop where the joiner or planer is located, or must perform the work with a hand tool at a remote location where the work is to be installed. Often, it is impractical or unfeasible to prepare all pieces of work before leaving the workshop where the machinery is located since it is common for pieces to require on site working or further modification. In the event that a piece prepared at the workshop is inadequate, the craftsman must modify the piece with a hand tool at the locus of installation.

A further drawback to non-portable joiners and surface planers is that they are very expensive, and cannot be afforded by all craftsman.

Hand held electric planers are well-known, and are manufactured by a variety of companies. While a craftsman may modify a previously prepared piece of stock, with a hand-held planer, such hand planers have drawbacks. Hand planers are inherently unstable, and consequently may create unevenness in a piece of stock being worked. For example, the amount of wood planed from a piece of stock with a hand planer will vary due to vibration and a rocking effect. Because of such inherent instability, hand-held planers are extremely limited for use as joiners. Further, since hand-held planers require that one or both hands be used to hold the planer and often require the craftsman to support the stock, operation of the planer is awkward and often very unsafe.

Accordingly, it is an object of the present invention to provide a workstand for supporting a hand-held electric woodworking machine.

Another object of the present invention is to provide a workstand for supporting a hand-held electric planer.

Yet another object of the present invention is to provide a workstand for supporting a hand-held electric planer so that it may be used as a joiner.

Another object of the present invention is to provide a portable workstand for supporting a hand-held electric planer.

Yet another object of the present invention is to provide an inexpensive table thickness and surface planer by using a workstand which supports a hand-held electric planer.

Still another object of the present invention is to provide means for planing or working stock efficient by and accurately by using a workstand supporting a hand-held electric planer.

One more object of the present invention is to provide means for supporting an electric planer so that both of the operator's hands are free to grip the piece of stock to be worked.

SUMMARY OF THE INVENTION

The foregoing and other objects of the present invention are achieved by a workstand having a horizontal base portion and a vertical wall extending upward away from the base. A hand-held electric planer may be secured to the vertical wall with the planer's cutting blade facing away from the base and its planing surface oriented transverse to the vertical wall. Means for pressing a piece of stock against the planing surface ensures even working of the piece of stock. The planer can thereby be used as a planer or joiner.

BRIEF DESCRIPTION OF THE DRAWINGS

The foregoing and other objects and advantages of the invention will be appreciated more fully when considered in connection with the accompanying drawings wherein:

FIG. 3 is an end view of the workstand shown in FIG. 1;

FIG. 4 is a cross-sectional view of a portion of the workstand taken along line 4—4 of FIG. 2;

FIG. 5 is a cross-sectional view of the workstand taken along line 5—5 of FIG. 2;

FIG. 6 is an end view of the workstand shown in FIG. 1 adapted to work as a joiner;

FIG. 7 is a side view of an alternate embodiment of the biasing device; and

FIG. 8 is an end cross-sectional view of the biasing device shown in FIG. 7.

DETAILED DESCRIPTION OF THE PREFERRED EMBODIMENT

Figure 1:
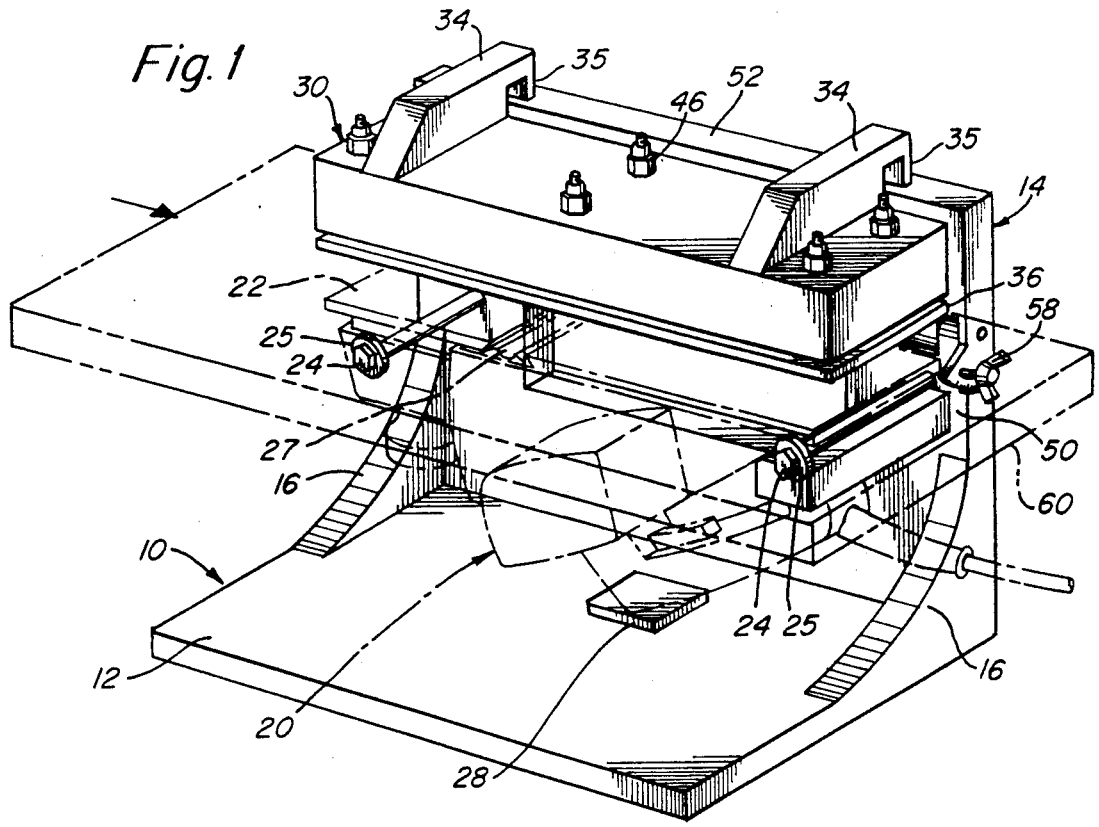
FIG. 1 is a perspective view of the workstand of the present invention in which a hand-held electric planer is shown in single dot single dash lines and a piece of stock is shown in double dot single dash lines.
Figure 2:
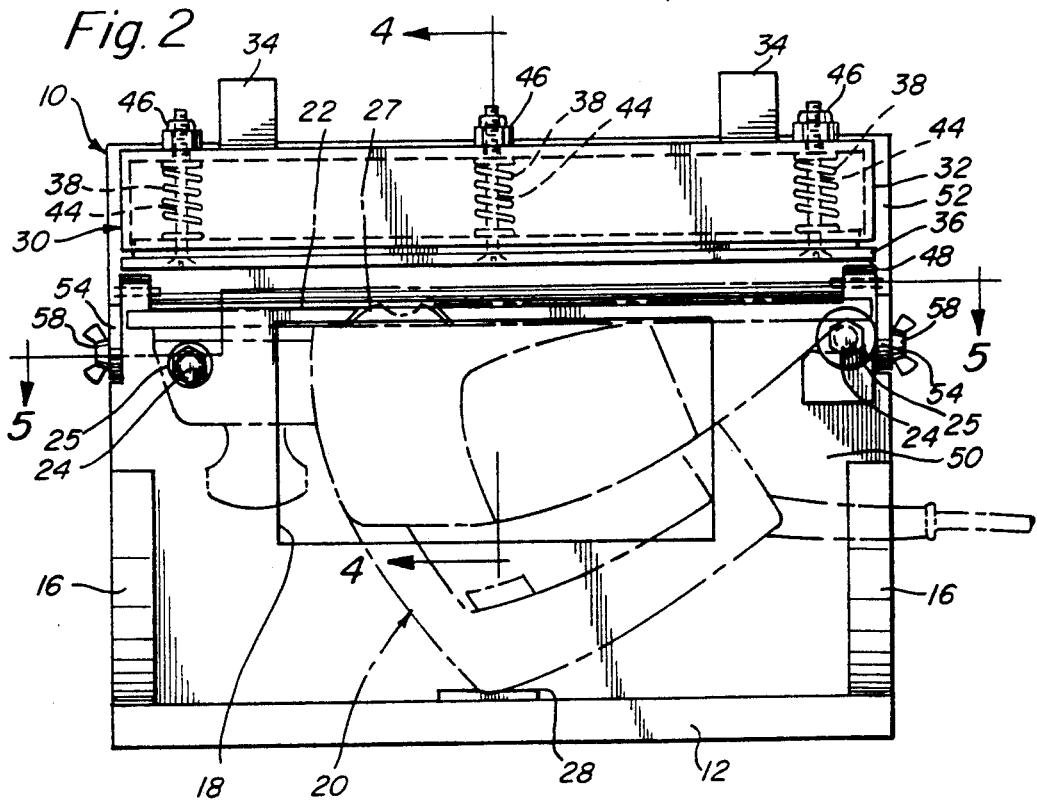
FIG. 2 is a side view of the workstand shown in FIG. 1.

Referring to FIGS. 1-6, the workstand 10 of the present invention includes a base 12 and a vertical wall 14 oriented 90° to the base 12 and extending upwardly away therefrom. A pair of supporting walls 16 extend between the base 12 and the vertical wall 14 to provide additional rigidity and strength to the stand. A hand-held electric planer 20 may be mounted to the workstand 10 so that its planing surface 22 is parallel to the base 12 adjacent the wall 14.

The size and shape of hand-held electric planers varies depending upon the manufacturer and model. In order to accommodate as many different planers as possible, the workstand 10 of the present invention has a window or opening 18 formed in the vertical wall 14 so that a portion 21 of a planer 20 projecting to the right in FIG. 4, extends through the window 18, thus permitting the planing surface 22 to abut the wall 14. In FIGS. 1-6, the planer 20, illustrated by a single dot single dash line, is a Makita Model No. 1900B planer. The workstand of the present invention is not intended to be limited to any particular brand or model, but rather, it is contemplated that most hand-held electric planers may be used with the workstand of the present invention.

The planer 20 is supported by mounting bolts 24 which extend through holes in the planer 20 and holes 23 in the vertical wall 14. The planer 20 is protected and further supported by a pair of washers 25 interposed between the heads of the bolts 24 and the planer 20. Mounting nuts 26, such as wing nuts, are utilized so that the planer 20 may be quickly and easily attached to and disconnected from the workstand 10.

A pad 28, made of a resilient, yieldable material, is attached to the base 12 of the workstand 10 to protect any portion of the planer 20 extending downwardly towards the base. The size of the pad 28 may be varied in order to accommodate different planers.

A biasing device 30, illustrated in FIGS. 1-5, may be attached to the vertical wall 14 to extend over the planing surface 22 and press or bias a piece of wooden stock 60 firmly against the planing surface 22.

The biasing device 30 includes a housing 32, support brackets 34, pressure plate 36 and springs 38. The support brackets 34 project from the top of the housing 32 and extend to the right as shown in FIGS. 3 and 4 over the vertical wall 14. Each bracket 34 is supported for vertical movement on the wall 14 by an integrally attached vertical rod 35 which extends downwardly and is parallely spaced from the rear edge of the bracket 34. Rods 35 are supported for sending in vertical slots 40 in vertical wall 14. A pair of bracket clamping screws 42 extend through the vertical wall 14 and adjustably engage the rods 35. The height of the biasing device 30 may be adjusted by loosening screws 42 moving the device 30 up or down to a desired position and retightening the screws 42.

The pressure plate 36 of the biasing device 30 is attached to the housing 32 by bolts 44 and nuts 46. Bolts 44 support and secure springs 38 between the housing 32 and the pressure plate 36. As can be seen most clearly in FIG. 4, the pressure plate 36 fits within the housing 32. A flange 35 extends horizontally outward from the plate 36 to limit the upper movement of the pressure plate 36. As a result of this configuration, the housing 32 guide the pressure plate 36. Bolts 44 are attached to the pressure plate, but are free to move through the housing 32. Nuts 46 are threadably engaged with the bolts 44 thereby limiting the downward movement of the pressure plate 36. The springs 38 bias the pressure plate downward away from the housing 32 towards the planing surface 22.

To plane a piece of stock 60, the clamping screws 42 are loosened so that the vertical rods 35 may move freely in the slots 40 in the vertical wall 14. The piece of stock 60 is then placed between the pressure plate 36 and the planing surface 22. The biasing device 30 is then positioned so that the stock 60 is held firmly between the pressure plate 36 and the planing surface 22. Once the desired position of the biasing device 30 is established, the clamping screws 42 are tightened to lock the rods 35 in place, thereby maintaining the biasing device 30 in the correct position. If after initial planing, the stock needs additional planing, the biasing device 30 may be repositioned by repeating the foregoing procedure so that it is at a slightly lower position with the pressure plate 36 slightly closer to the planing surface 22.

If the planer is mounted to the workstand and the biasing means is not utilized, longer pieces of stock may experience "chatter" which is the vibration of the piece of stock as it travels over the cutting head. As a consequence, the piece of stock will be planed unevenly. Thus, it is preferred that the biasing means be utilized for longer pieces of stock if not all pieces.

Although the illustrated embodiment employs multiple springs and bolts, the present invention is not meant to be limited thereby. Any equivalent biasing device such as one having at least one leaf-spring, as shown in FIGS. 7 and 8, may be employed for this purpose. FIGS. 7 and 8 illustrate an alternate embodiment in which the multiple coil springs 38 and bolts 44 have been replaced by a single leaf-spring 90. The leaf spring 90 is attached to the housing 32 at or near its center by rivets or retainers 92. The ends of the leaf-spring are attached to the pressure plate 36 by rivets or retainers 94. The leaf-spring is made from steel and is resilient enough to provide biasing of the pressure plate 36 away from the housing 32. By the configuration shown in FIG. 8, both ends of the pressure plate 36 are connected to the leaf-spring to provide even pressure. While FIGS. 7 and 8 illustrate only a single leaf-spring, multiple leaf springs may be employed to further enhance the even application of pressure along the surface of the pressure plate 36.

As shown in FIGS. 1-3 and 6, the vertical wall 14 comprises a lower section and an upper section 52 pivotally attached to it. Referring to FIGS. 3 and 6, the upper section 52 is pivotally secured to the lower section by a pair of flanges 54 at either end that extend downwardly over the ends of the lower section to which it is secured. The flanges 54 are fan shaped and extend inwardly towards the planer 20. Arcuate slots 56 are formed in the flanges 54 and bolts 58 extends through the slots 56 into the lower section 50 of the vertical wall 14. The arcuate slots 56 are positioned so that the upper section 52 may be pivoted, from a position where it is vertically coplaner with the lower section 50, inward towards the planing surface 22 of the planer 20. The angle through which the upper section 52 may be pivoted is limited only by the length of the arcuate slot 56. As shown most clearly in FIG. 6, by pivoting the upper section 52 inward towards the planing surface 22 of the planer 20 the apparatus may be utilized as a joiner. For this purpose the biasing device 30 is removed. As a joiner, a piece of stock 60 simultaneously is pressed against the inner wall or fence 59 of the upper section 52 and the planing surface 22 of the planer 20 so that as the piece of stock 60 runs across the planing surface 22, the cutting head 27 of the planer 20, shown in FIG. 2, planes the workpiece 60 so that the face adjacent the planing surface 22 is formed at an angle other than 90° relative to adjacent surfaces. The angle that the surface is planed at corresponds to the angle of the upper section 52 relative to the lower section 50. A series of markings 62 (FIG. 6) are provided on the flange 54 to indicate the angular position of the upper section 52 relative to the lower section 50.

The planing surface 22 of the planer 20 abuts the wall 14 along the line where upper and lower sections 52 and 50 meet. By this configuration, the planer 20 mounted to the stand 10 may be utilized as a joiner.

The illustrated embodiment employs the foregoing flange and slot structure to pivot the upper section 52 relative to the lower section 50. However, other equivalent structures may be employed for pivoting the upper section relative to the lower section, and the present invention is not meant to be limited thereby.

The workstand of the present invention is preferably made from aluminum, steel, or a similar material. The Makita model 1900B hand-held electric planer has a pair of lateral holes for attaching a guide plate. The mounting bolts of the present invention are inserted through these holes to attach the planer to the vertical wall 14. Most, if not all other hand-held electric planers have some sort of laterally extending holes to attach a side guide plate. Such planers may be attached to the vertical wall in a manner similar to the illustrated embodiment by inserting bolts through the laterally extending holes. Bolts tailored to non-circular holes may be required for some models.

The workstand of the present invention may be used as a surface or thickness planer or as joiner. A mounted planer may perform as a joiner when the upper section of the vertical wall extends straight upwards or is inclined. Furthermore, a mounted planer may be used for rabbiting.

From the foregoing description, it is clear that a hand-held electric planer may be easily mounted to the workstand of the present invention by two mounting bolts. While the illustrated embodiment uses bolts 24 to mount the planer 20 to the workstand 10, other devices may be employed, such as clamps. The resulting mounted hand planer provides stability substantially the same as a table planer. The biasing device ensures that the workpiece is planed evenly along its entire surface.

The size of the workpiece to which the planer may be applied is not limited to one having a width equal to the width of the cutting blade. Rather, a workpiece twice as wide as the width of the cutting blade may be planed by feeding the workpiece over the cutting blade once and then rotating the workpiece 180° so that the unplaned half of the workpiece is subsequently fed over the cutting blade to thereby plane the entire surface of the workpiece. With further minor modification, the apparatus of the present invention may be utilized to plane boards having a width even greater than twice the width of the cutting surface. For such a procedure, the planer and biasing device are mounted so that they may be spaced away from the vertical wall.

The workstand of the present invention is much less expensive than typical large heavy planers, which are not portable. The typical planers and joiners run on the order of hundreds, if not thousands of dollars. The present invention provides a stand to which a hand planer may be mounted, resulting in a small scale table planer, at a fraction of the cost of conventional table planers and joiners.

Due to its portability, the workstand of the present invention can be employed directly at a site remote from a workshop. Consequently, the time to complete a task is decreased by eliminating or reducing any time necessary for travel between repeated workings at the workshop and the work site.

It should be understood that the foregoing description of the invention is intended merely to be illustrative thereof and that other embodiments, modifications and equivalents may be apparent to those skilled in the art without departing from its spirit.

Having thus described the invention, what I desire to claim in the Letters Patent is:

1. A workstand for supporting a hand-held electric planer comprising:
    a base;
    upstanding wall means extending vertically upward from said base; and
    mounting means for mounting said planer to said upstanding wall means.

2. A workstand as recited in claim 1, further comprising means for biasing a workpiece against a planing surface of said planer.

3. A workstand as recited in claim 2, wherein said biasing means is attached to said upstanding wall means.

4. A workstand as recited in claim 1, wherein said mounting means comprises bolts extending laterally through holes in said planer for attachment to said upstanding wall means.

5. A workstand as recited in claim 1, further comprising a pad mounted on said base for supporting and protecting said planer.

6. A workstand as recited in claim 1, further comprising an opening in said upstanding wall means for providing access for said planer so that a planing surface of said planer abuts said upstanding wall means.

7. A workstand as recited in claim 1, wherein said upstanding wall means comprises:
    a lower section,
    an upper section pivotally mounted to said lower section, and
    means for securing said upper section at an angle relative to said lower section.

8. A workstand as recited in claim 2, wherein said biasing means further comprises a pressure plate for pressing the workpiece against said planing surface of said planer.

9. A workstand as recited in claim 8, wherein said pressure plate is biased by at least one coil spring.

10. A workstand as recited in claim 8, wherein said pressure plate is biased by at least one leaf spring.

11. A workstand as recited in claim 8, further comprising a height adjustment means for adjusting the height of said biasing means relative to said planing surface.

12. A workstand as recited in claim 11, wherein said height adjusting means comprising slots formed in said upstanding wall means and locking means for locking rods connected to said biasing means in said slots.

13. A workstand for supporting a tool while working on a workpiece comprising,
    a base,
    a tool supporting means extending upwardly from and secured to said base, said means including means for rigidly securing said tool and guide means positioned above said tool supporting means for guiding said workpiece in movement against said tool, and means for adjusting said guide means over a range of angles with respect to said tool support means whereby workpieces may be guided over said tool at selected angles.

* * * * *